UNITED STATES PATENT OFFICE.

HENRY CUNNINGHAM, OF BATCHTOWN, ILLINOIS.

ROOFING-PAPER.

SPECIFICATION forming part of Letters Patent No. 446,145, dated February 10, 1891.

Application filed December 9, 1890. Serial No. 374,081. (No specimens.)

*To all whom it may concern:*

Be it known that I, HENRY CUNNINGHAM, of Batchtown, in the county of Calhoun and State of Illinois, have invented certain new and useful Improvements in Roofing-Paper; and I do hereby declare the following to be a full, clear, and exact description of the invention, such as will enable others skilled in the art to which it pertains to make and use it, reference being had to the accompany drawing, which forms part of this specification.

My invention relates to an improvement in roofing-paper; and it consists in a composition composed of boiled linseed-oil and pulverized charcoal, which is applied to the paper, as will be more fully described hereinafter.

In the manufacture of my new roofing-paper I take boiled linseed-oil and add to it enough pulverized charcoal to form a composition like paint. The amount of charcoal may be varied, according to the thickness of the mixture desired. This mixture of oil and charcoal is applied to the paper one or more times, according to the quality of the paper desired, and this paper will be found to be perfectly air and water proof under all circumstances. The charcoal in this composition serves to solidify the paper so that the sun cannot draw anything out of it, and which hardens the paper so that it is very durable, and at the same time forms a thoroughly water-proof coating therefor.

Having thus described my invention, I claim—

As a new article of manufacture, a roofing-paper having a coating of linseed-oil and charcoal, for the purpose described.

In testimony whereof I affix my signature in presence of two witnesses.

HENRY CUNNINGHAM.

Witnesses:
S. A. WHITE,
W. W. BATCHELDER.